Patented Nov. 4, 1941

2,261,918

UNITED STATES PATENT OFFICE 2,261,918

TREATMENT OF FERMENTATION MATERIALS

Ernest E. Pittman and Robert Roger Bottoms, Louisville, Ky., assignors to The Girdler Corporation, Louisville, Ky., a corporation of Delaware No Drawing. Application October 7, 1939, Serial No. 298,450

3 Claims. (Cl. 202—56)

This invention relates to treatment of fermentation materials, and is a continuation in part of our copending application Serial No. 210,163, filed May 26, 1938.

In the manufacture of alcohols, alcoholic products, acetone and similar materials from alcohol-producing organic substances, a fermentation of such substances results in a fermentation liquor which is then distilled to effect a separation of the volatile alcohol from a residue known as slop.

In our copending case the use of bentonite for recovering valuable by-products and reducing the nuisance of the waste effluents in the process of treating such slop was disclosed.

During the fermentation, and particularly during distillation of fermented liquors, substantial amounts of water soluble vitamins pass into solution. When a recovery of such vitamins is intended, the recovery should therefore take place prior to the distillation step if possible, but heretofore limitations inherent in recovery processes have required that recovery be made after rather than before distillation.

In the production of potable beer it is desired to retain colloidal proteins, vitamins and the like in the final product since they possess food values, aid in froth retention and have other advantages. In contrast with this situation, the manufacture of alcohols, acetone, alcoholic products such as whiskey and similar materials involves the production of an intermediate fermentation liquor in which such colloidal proteins, vitamins and the like not only are unnecessary in the final product, but are in fact detrimental to the distillation step and to any subsequent evaporation of residual slop since they deposit on rectifier surfaces and reduce efficiency of distillation and/or evaporation.

Various attempts to recover the proteins from such fermentation liquors for use as by-products have been made, one of which is shown in Hildebrandt Patent No. 1,921,991. So far as known, however, no solution has been found which is commercially satisfactory, since the recovered material must be of a high vitamin potency, necessitating the recovery not only of the suspended but also the soluble proteins and vitamins; must not be contaminated by a large ash content; must not require elaborate chemical treatments, and must be relatively inexpensive to produce. These requirements cannot be satisfied by previously suggested process such as those employing fuller's earth.

It has now been discovered that bentonite when used in colloidal form and in a comparatively small amount may be employed in the treatment of the fermentation liquor prior to the distillation step, and that when so employed remarkable advantages in the recovery of by-products of high vitamin potency will be achieved.

Merely as an example, the invention is described with respect to the manufacture of ethyl alcohol from molasses, and it is to be expressly understood that the invention is in no way intended to be limited solely to this use.

When manufacturing industrial alcohols from organic materials the prepared yeast is added to the prepared organic material, and fermentation is conducted at the optimum temperature with concurrent production of $CO_2$ gas which is separately removed. When grain is employed as the organic material, a residue of grain solids and yeast particles remains in the beer in suspension and in solution, as disclosed in our copending application, and the major part of these solids is in suspension while the minor part is in solution.

When molasses is employed as the organic material, it is customary to use sulphuric acid and ammonium sulphate in the fermentation, and such materials as yeast particles, salts, gums, etc., remain in the fermentation liquors in suspension and in solution, with the major part of these solids in solution and the minor part in suspension.

In either event as the bio-chemically treated liquor is distilled under temperatures of about 150–212° F., solids therefrom collect on the surfaces of the distillation equipment and require periodic cleaning of the stills. The presence of these solids exerts undesirable effects on the efficiency of distillation, and the distillation under heat causes more of the soluble vitamins to go into solution. Attempts have been made to remove as much as possible of these solids from the fermentation liquor prior to the distillation, but have not been satisfactory due to the low temperature, the inability of known apparatus to remove the solids from solution and from colloidal suspension, and the necessity of avoiding use of precipitants which would influence the purity or recovery of the alcohol or other product contained in the liquor and which would increase the ash content of the recovered values substantially.

This invention has as an object the provision of a process for treating bio-chemically treated liquors in which substantially all of the protein and vitamins therein are removed prior to the distillation step.

Other objects are the provision of a process for removing solids and vitamins in solution from fermentation liquors; for improving distillation of alcohol, butanol and acetone bearing materials; for producing improved by-products of bio-chemical origin; for producing a new and improved feed or ingredient of feed of high vitamin potency; for increasing the volume of by-products recovered from alcohol manufacture; for producing an improved fertilizer; and for maintaining at a low value the ash content of by-products recovered from alcohol manufacture.

In carrying out the invention one suitable arrangement consists in directing the fermentation liquors from the fermenting tubs and at the normal temperature of about 90° F., through a mixer and thence into a vat wherein any desired period of retention may be had, for example from 1 to 10 minutes or more. In the mixer an amount of colloidal bentonite which does not exceed 2% of the weight of the fermentation liquor is thoroughly mixed therewith without the necessity of changing the temperature of such liquors. The bentonite employed should be of such a character that it will form a stable colloidal suspension in water. It is found that the bentonite may be added in dry form or as a slurry with water or with filtrate from a later step. The mixture of bentonite and fermentation liquor may then be kept in the retention vat for the period of time desired for complete adsorption of suspended and soluble protein and vitamins upon the bentonite. If desired the mixture may be agitated and heated, although this is not ordinarily necessary when a sufficient retention period is allowed. Satisfactory results, for example, have been secured on ethyl fermentation liquors with mixtures ranging in temperature from 90° F. to 150° F., and with retention periods ranging from 1 to 10 minutes.

Following this mixing of materials under conditions wherein the bentonite adsorbs from the fermentation liquors substantially all of the protein and vitamins, both suspended and soluble, and forms a coagulum, the mixed materials are then directed into a separatory apparatus which may be any of a filter, filter press, centrifuge or gravity separation apparatus. In this separatory apparatus the coagulum and the salt precipitate normally present in such liquors are separated from the clear solution. Clear liquors which contain the alcohol, butanol, acetone, alcoholic product or the like, are then directed to the still and, being in this clarified state, can be more readily distilled than has been the case heretofore.

The slop residue from the still may then be conveniently directed to an evaporator wherein it will be concentrated to sirup and then dried to recover other valuable products such as fertilizer. If desired, such slop could be directed to disposal and would have a much lower B.O.D. due to the removal of the decomposable proteins therefrom as thus achieved by the process.

The solids separated from the fermentation liquors form an important by-product, and since the colloidal bentonite has removed from solution the soluble protein and vitamin which may amount to as much as one-half per cent. of the fermentation liquors, a greater recovery of this by-product results. As an important feature of the invention it has been discovered that the coagulum of bentonite and protein has well defined filter aid properties and consequently the separation is facilitated since the coagulum also assists in retaining salts and gums which may be recovered at the same time in the by-product. Tests have shown that the volume of by-product recovered by this process is greatly increased over known recovery processes, that the vitamin content of the by-product is higher than in the customary commercial processes, that the ash content of the by-product is approximately the same as in the usual by-product, and that much better distillation and evaporation of the fermentation liquor and slop results.

Where the recovered product is to be used as a fertilizer, or where the ash content is not of primary importance, the use of a larger amount of bentonite than is actually needed is not a serious objection, and the bentonite may amount to as much as 2%. Where the production of a feed or the obtaining of the vitamins is the desired object, no excess of bentonite should be used, and satisfactory results have been obtained by the use of 0.15% to 0.2% of bentonite.

Having thus described our invention what we claim as new and desire to secure by Letters Patent is:

1. In the method of producing and recovering alcohol and other volatile fermentation products from fermented liquors, the steps of mixing colloidal bentonite with the fermented liquor in the ratio of not to exceed 2% by weight, to form a coagulum of the bentonite and said soluble and suspended solids of said liquor, separating said coagulum from the liquor, and thereafter distilling the clarified liquor to remove and recover said alcohol and other desirable volatile products.

2. In the method of producing and recovering alcohol and other fermentation products from the product resulting from fermenting molasses by the action of yeast, the steps of mixing colloidal bentonite with the fermented product to thereby form a coagulum of the bentonite and the soluble and suspended vitamins, removing said coagulum, and thereafter distilling off from said liquor the alcohol and other volatile fermentation products.

3. In the method of producing and recovering alcohol and other volatile constituents from fermented liquors, the steps of mixing colloidal bentonite with said liquor in the ratio of not to exceed 2% by weight, heating to facilitate the formation of a coagulum of the bentonite and said soluble and suspended solids, separating said coagulum from the liquor, and thereafter distilling the clarified liquor to remove and recover alcohol and other desirable volatile products.

ERNEST E. PITTMAN.
ROBERT ROGER BOTTOMS.